US006868414B2

(12) United States Patent
Khanna et al.

(10) Patent No.: US 6,868,414 B2
(45) Date of Patent: Mar. 15, 2005

(54) TECHNIQUE FOR SERIALIZING DATA STRUCTURE UPDATES AND RETRIEVALS WITHOUT REQUIRING SEARCHERS TO USE LOCKS

(75) Inventors: Sanjay Khanna, Cary, NC (US); Lori Ann Napoli, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 09/753,992

(22) Filed: Jan. 3, 2001

(65) Prior Publication Data

US 2002/0087564 A1 Jul. 4, 2002

(51) Int. Cl.[7] .............................................. G06F 17/30
(52) U.S. Cl. .................... 707/3; 707/2; 707/8; 707/201
(58) Field of Search ............................. 707/2, 3, 8, 201

(56) References Cited

U.S. PATENT DOCUMENTS

| | | | | | |
|---|---|---|---|---|---|
| 4,627,019 | A | * | 12/1986 | Ng .................................. | 707/8 |
| 5,497,487 | A | * | 3/1996 | Fortier ........................... | 707/8 |
| 5,852,715 | A | * | 12/1998 | Raz et al. ..................... | 709/201 |
| 6,006,216 | A | * | 12/1999 | Griffin et al. .................. | 707/2 |
| 6,199,069 | B1 | * | 3/2001 | Dettinger et al. ............ | 707/202 |
| 6,353,820 | B1 | * | 3/2002 | Edwards et al. ............... | 707/2 |
| 6,360,219 | B1 | * | 3/2002 | Bretl et al. ..................... | 707/8 |
| 6,377,959 | B1 | * | 4/2002 | Carlson ....................... | 707/202 |
| 6,480,854 | B1 | * | 11/2002 | Gross et al. .................. | 707/10 |
| 6,535,869 | B1 | * | 3/2003 | Housel, III ..................... | 707/2 |
| 2002/0004799 | A1 | * | 1/2002 | Gorelik et al. ............... | 707/201 |

OTHER PUBLICATIONS

"Serialization of AVL–Binary Tree Element Retrieval via Duplexed Pointers", Mar. 1992, IBM Technical Disclosure Bulletin, No. 10B, pp. 138–139.*
IBM Technical Disclosue Bulletin, "Serialization of AVL Binary Tree Element Retrieval via Duplexed Pointers", Mar. 1992, pp. 138–139.

* cited by examiner

Primary Examiner—Shahid Alam
Assistant Examiner—Chongshan Chen
(74) Attorney, Agent, or Firm—Marcia L. Doubet; Jerry W. Herndon

(57) ABSTRACT

The present invention provides a method, system, and computer program product for reliably and efficiently serializing access to data structures (i.e. updates and retrievals) without requiring searchers to use locks. The disclosed technique ensures that the contents of the data structure remain valid during access operations, yet does not require searchers to perform compute-intensive comparison operations to determine validity. Two trees are used at all times. Searches proceed against a first tree, while the second tree is used for performing updates. The steps required to carry out a particular update operation are stored as a queued transaction. When the update to the second tree completes, the trees are switched. The queued transaction is applied to the now-out-of-date tree, such that the nodes of this tree do not need to be searched or otherwise evaluated in order to perform the update, thereby optimizing the process of bringing this tree into synchronization with the tree that is now being used by the searchers. The two trees are repeatedly switched as additional update operations are performed. Atomic operations are used to ensure proper synchronization between the search and update processing on the trees.

19 Claims, 6 Drawing Sheets

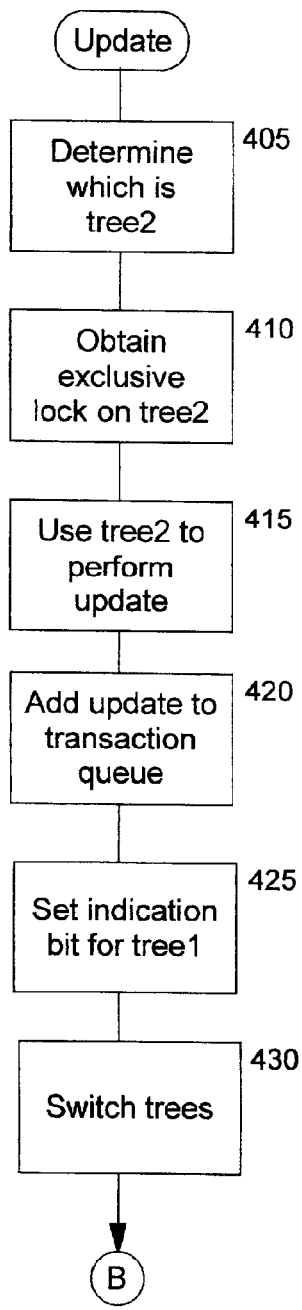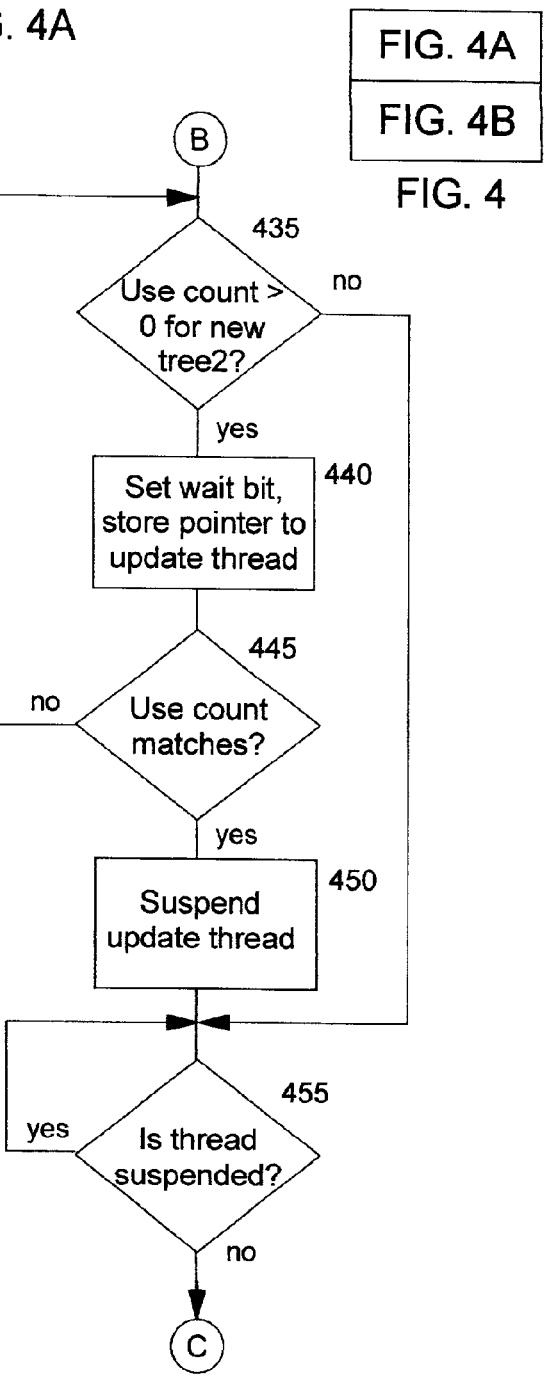
FIG. 4A
FIG. 4

TECHNIQUE FOR SERIALIZING DATA STRUCTURE UPDATES AND RETRIEVALS WITHOUT REQUIRING SEARCHERS TO USE LOCKS

BACKGROUND OF THE INVENTION

1. Field of the Invention

The present invention relates to a computer system, and deals more particularly with a method, system, and computer program product for serializing data structure updates and retrievals without requiring searchers to use locks. The disclosed techniques may be used advantageously for, inter alia, optimizing performance of data structures used for network routing.

2. Description of the Related Art

A number of different types of data structures may be used in a computing system for storing information for which access time, including updates and retrievals of the stored information, is critical. These data structures include linked lists, hash tables, and tree structures. Tree structures in particular are often used as a technique for optimizing the number of operations that must be performed to locate a particular item within an ordered file system or database.

A number of different types of tree structures are known in the art, including binary trees, m-way trees, AVL trees (named for Adelson-Velskii and Landis, who introduced them), radix trees, B-trees, B*-trees, B'-trees, tries, and so forth. In binary trees, each node has at most two child nodes. AVL trees are also commonly referred to as height-balanced binary trees, which means that any subtree within the AVL tree is no more than one level deeper on its left (or right) side than it is on the right (or left) side. Radix trees are trees in which a search progresses based on a composite of the information found in the nodes. B-trees are height-balanced m-way trees, where an m-way tree is a search tree that has at most some number "m" entries in each node of the tree. B*-trees, B'-trees, and tries are all variations of B-trees. The particular nuances of these varying types of trees are not critical to an understanding of the present invention, and thus will not be described in further detail. (For a detailed discussion of these types of tree structures, reference may be made to "Fundamentals of Data Structures", E. Horowitz and S. Sahni, published by Computer Science Press, Inc. (1976), pp. 422–549.)

It is desirable to balance a tree in order to assure an optimal and consistent worst-case cost in terms of the number of tree accesses that are required for locating a particular item (or, conversely, for determining that the particular item does not exist in the tree). As nodes are inserted into a balanced tree and deleted therefrom, it is necessary to re-balance the tree in order that the advantageous properties of the balanced tree are maintained. Algorithms for keeping trees in balance are known in the art. Typically, such algorithms tend to be complex and costly in terms of execution time. Furthermore, a re-balancing operation may result in decreased system performance because the tree cannot be used for productive accesses while the re-balancing is being performed.

When using tree structures on multi-programming operating systems that support concurrent execution by multiple threads, it is quite likely that one or more threads will try to access a particular tree for the purpose of retrieving already-stored data at the same time that one or more other threads tries to access the tree for updating (i.e. inserting, deleting, or changing) information. To ensure that the retrieval threads do not collide with the update threads and thereby return invalid or corrupted results to the requesting processes, serialization techniques are typically used to control the order in which the threads access the tree. When running in a multi-processor (MP) environment having a symmetric MP operating system (such as the OS/390® operating system from the International Business Machines Corporation ("IBM")) wherein the computing task is shared among multiple central processing units, the serialization task becomes especially difficult. ("OS/390" is a registered trademark of IBM.)

One technique commonly used in the prior art for providing serialized access to tree structures is locking. Typically, threads or tasks that need only to retrieve information (referred to herein as "search tasks" or "searchers") obtain a shared lock before using a tree, where a shared lock enables more than one search task (i.e. all those sharing the lock) to retrieve information at the same time. Tasks that need to update information, on the other hand, typically obtain an exclusive lock. While a task has an exclusive lock on a tree, no other update tasks nor any search tasks can access the tree. Instead, those tasks are typically suspended while waiting for the currently-active update process to complete and release the exclusive lock, at which time the suspended tasks will be resumed. Thus, while locking provides the necessary serialization, it does so at a very high cost in terms of performance overhead. For very busy systems such as super servers, the expense of this type of locking approach leads to very serious performance degradation.

Tree structures are commonly used in the routing tables of routers and gateways (referred to hereinafter as routers, for ease of reference), as a means for quickly evaluating the Internet Protocol (IP) address in a data packet in order to determine how to route the packet while providing an acceptable level of performance and throughput. As link speeds are increasing, the number of IP packets which a router is required to process per second is becoming very high. If an exclusive lock is held on a routing table implemented using a tree structure, then all data transfers and forwarding must stop until the lock is released. Operations on trees may require a significant amount of programming logic, and expenditure of a significant amount of computing time for rebalancing trees (as well as for traversing the trees to find a particular route). As will be obvious, it is very undesirable for the data transfers and forwarding to be halted even for relatively short periods of time, and thus it is desirable to optimize the tree operations.

Another technique commonly used in the prior art for providing serialized access to tree structures is to minimize the time spent in the locked status by not actually re-structuring or re-balancing the trees each time an update is performed. In this approach, deleted nodes are not completely removed until some predetermined number of deletes have been processed—or perhaps until a predetermined amount of time has elapsed. When this number of deletes occurs or this amount of time elapses, an exclusive lock is obtained, suspending all search tasks as the restructuring occurs. In some extreme cases, the entire tree may need to be rebuilt. In the interim, while it is not yet time to restructure the tree, the deleted nodes are simply marked as deleted or invalid. A serious disadvantage of this approach is that each task using the tree must check each node it accesses to determine whether that node is still valid, which significantly increases the access time of the task.

"Serialization of AVL-Binary Tree Element Retrieval via Duplexed Pointers", *IBM Technical Disclosure Bulletin*, No.

10B, pp. 138–139 (March 1992) discloses a technique for serializing AVL trees without requiring locks for retrieval tasks. In this technique, the tree header contains an active tree indicator, a synchronization count, and a duplexed pair of pointers to the first tree element. Each node in the tree contains a key, a user data field or pointer thereto, a duplexed pair of left child pointers and a duplexed pair of right child pointers, and a duplexed pair of balance indicators. Retrieval operations use the active tree indicator to know which of the set of left and right child pointers to use (i.e. the "active" pointers); update operations use the opposite ones of these pointers (i.e. the "inactive" pointers). Each time an update is performed, the synchronization count in the tree header is incremented and the active tree indicator is switched. The values are stored in adjacent storage so that a single atomic action can be used for the increment and switch, ensuring that both are performed simultaneously. Prior to performing a retrieval, these values are saved. After the retrieval operation occurs, the saved values are compared to the values currently stored in the tree header. If they are identical, the retrieval ends normally. Otherwise, when they are different, this is a sign that the retrieval occurred from a now-obsolete version of the tree, and the retrieve operation must be re-done until the synchronization count and active tree indicator values have not changed. Updates are made to the inactive tree, without regard to whether searchers are still using the tree. This may have catastrophic results in some cases (e.g. when an update operation deletes a pointer that a search task is looking at.) This disclosure states that the storage for any node that was once part of the tree cannot be freed, as this will cause the retrieve operation to fail; instead, storage that is no longer needed for a node (e.g. because the node has been deleted or has been replaced by another node during an update process) is pooled and may be reused as part of the tree.

Commonly-assigned U.S. Pat. No. 5,089,952, which is entitled "Method for Allowing Weak Searchers to Access Pointer-Connected Data Structures Without Locking", teaches a technique for avoiding use of locks while still ensuring that the content of the tree remains in a correct state. (A "weak searcher", as defined therein, is an access task that has no intent of updating the stored information.) Update operations first lock the "scope" of a node, using prior art techniques which are not described for determining the scope (where the scope is defined as the path from a "deepest safe node"—i.e. a node that will not overflow or underflow during an update—to a leaf of the tree). The disclosed technique retains deleted nodes and nodes which have become redundant while performing insertions, where these deleted and redundant nodes are referred to as "disconnected nodes", until one of several defined criteria has been met. In one solution, time stamps are used, where each searcher keeps track of how long it has been using the tree and compares this duration to a predetermined time period. If the search is not completed within this time period, it must be aborted and restarted. In a second solution, either a range and level value are added to each node in the tree and searchers must evaluate this range and level as they traverse each node, or a creation time is added to each node and searchers must check this creation time value. In either case, the search may need to be aborted and restarted, depending on the result of the comparison. In a third solution, a unique object identifier is added to each node, and this identifier must be checked during the search using one of the techniques from the second solution to determine whether the search must be restarted. The patent states that, in each of the three solutions, searchers will occasionally be required to restart their search unnecessarily. While the disclosed technique provides advantages over the prior art, the need to repeat searches as well as the need to perform additional operations to check the validity of nodes during the searching process add to the overhead of performing searches.

It would be preferable to use a serialization approach that minimizes use of locks (and thereby minimizes the resulting suspension of tasks) yet still guarantees that search results are valid and does not require searches to be re-started. Furthermore, it is desirable that the serialization approach has good performance characteristics and that it allows storage to be readily freed and re-used. The solution should preferably be extendable to other types of data structures, in addition to trees. The manner in which the present invention satisfies these objectives is described herein.

SUMMARY OF THE INVENTION

An object of the present invention is to provide a technique for serializing data structure retrieval and update that minimizes use of locks yet still guarantees that search results are valid and does not require searches to be re-started.

Yet another object of the present invention is to provide this technique in a manner that does not require use of time stamps or validity checks by searchers as they traverse through a data structure.

A further object of the present invention is to provide this technique in a manner that enables re-use of freed storage.

Another object of the present invention is to provide this technique wherein the data structure is a tree (such as a B-tree).

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a computer program product, a system, and a method for serializing data structure retrievals and updates. In one aspect, this technique comprises: creating two identical tree structures, each representing an initial state for accessing stored data; performing searches against a first of the two trees; performing a first update against a second of the two trees, yielding a revised tree; switching the first tree and the revised tree, such that the first tree becomes the second tree and the revised tree becomes the first tree; performing, after the switching step, a second update against the second tree, yielding a synchronized tree that is structurally identical to the first tree; and performing subsequent searches against the first tree.

The technique preferably further comprises obtaining an exclusive lock prior to performing the first update and releasing the exclusive lock after performing the second update and the switching. Atomic transactions are preferably used to maintain proper synchronization between the first tree and the second tree. Performing the first update may further comprise queuing a transaction, in which case performing the second update further comprises applying the queued transaction against the second tree that results from the switching. The technique may further comprise performing a subsequent update against the synchronized tree that results from performing the second update, which causes repeating the switching of trees.

In another aspect, this technique comprises: maintaining two trees, a first of which is used for one or more concurrent searches and a second of which is used for an update operation; switching the two trees after performing the update operation; and synchronizing the two trees such that both reflect the update operation.

In yet another aspect, this technique comprises: maintaining two data structures, a first of which is used for one or more concurrent searches and a second of which is used for an update operation; switching the two data structures after performing the update operation; and synchronizing the two data structures such that both reflect the update operation. The two data structures may be, for example, B-trees.

The present invention will now be described with reference to the following drawings, in which like reference numbers denote the same element throughout.

DESCRIPTION OF THE PREFERRED EMBODIMENT

Figure 1:
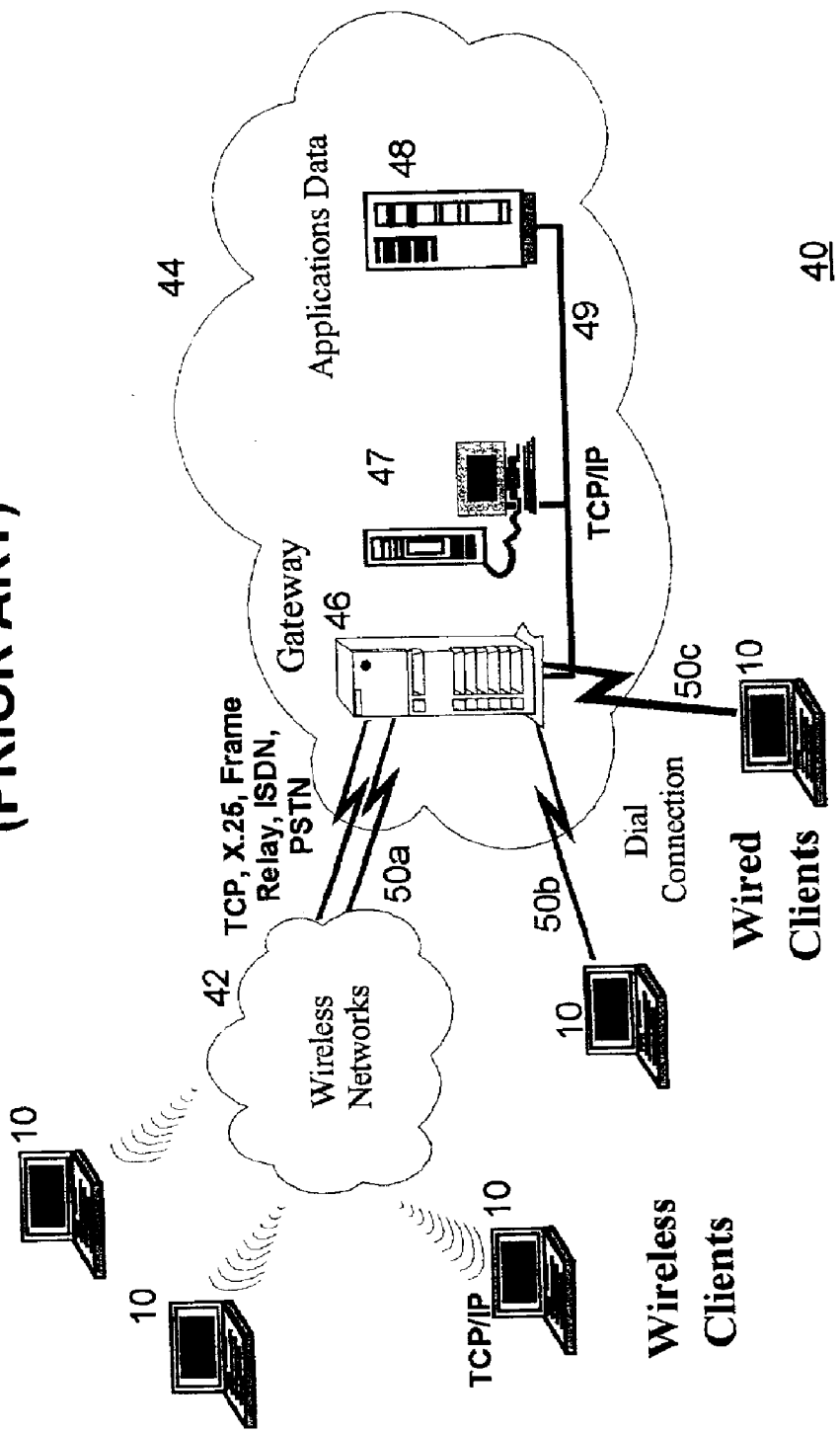
FIG. 1 is a diagram of a networked computing environment in which the present invention may be practiced.

FIG. 1 illustrates a data processing network 40 in which the present invention may be practiced. The data processing network 40 may include a plurality of individual networks, such as wireless network 42 and network 44, each of which may include a plurality of individual workstations 10. One or more routers (not shown) are typically used to route traffic among networks. Additionally, as those skilled in the art will appreciate, one or more LANs may be included (not shown), where a LAN may comprise a plurality of intelligent workstations coupled to a host processor.

Still referring to FIG. 1, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 and/or server 47 may be implemented utilizing an Enterprise Systems Architecture/370 available from IBM, an Enterprise Systems Architecture/390 ("ESA/390") computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.) These are merely representative types of computers with which the present invention may be used.

The gateway computer 46 may also be coupled 49 to a storage device (such as data repository 48). Further, servers such as gateway 46 and application server 47 may be coupled to other servers (not shown in FIG. 1).

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 1.

In the preferred embodiment, the present invention is implemented in computer software, although a solution implemented partly or entirely in hardware is also within the scope of the present invention. When implemented in software, the programming code which embodies the present invention is typically accessed by a computing device such as a router, a user workstation, or a server or gateway (such as gateway 46 and/or server 47) from long-term storage media of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory of the appropriate device. The techniques and methods for embodying software programming code in memory, on physical media, and/or distributing software code via networks are well known and will not be further discussed herein.

The devices on which the present invention may be used advantageously include a client device, server, or intermediary device in a network, as well as a standalone device that is not operating as part of a network. Or, the software may execute on multiple devices in a distributed manner, or it may operate simultaneously on multiple processors in an MP operating system such as OS/390. (As an example of operating on multiple devices, the search algorithm disclosed herein may operate primarily on client devices which first obtain the relevant bit settings to be used in the search algorithm from code executing on a central server.) When used in a networking environment, an implementation of the present invention may be executing in a Web environment, where a Web server provides services in response to requests from clients connected through the Internet. Alternatively, an implementation of the present invention may be executing in a non-Web environment (using the Internet, a corporate intranet or extranet, or any other type of network). Configurations for the networking environment include a client/server network, as well as a peer-to-peer environment. These environments and configurations are well known in the art. For ease of reference, the preferred embodiment will be described hereinafter in terms of operations that occur on a single computing device.

The present invention provides a reliable and efficient technique for serializing access to data structures. This serialization technique will be discussed herein in terms of serializing access to tree data structures, although this is for purposes of illustration and not of limitation. Alternatively, this technique may be used with other data structures (including, but not limited to, hash tables) for providing optimal serialized access.

The technique of the present invention provides improved serialization for access to tree structures by using reference counts (also referred to herein as "use counts") to keep track of whether a search tree is in use and by using atomic instructions for updating and checking particular values. These atomic instructions are used for synchronizing the data structure access processes in order to guarantee valid search results. The atomic instructions used in the preferred embodiment are Load Multiple (LM), which is used to load values into two registers at the same time; Compare and Swap (CS), which compares two 4-byte values; and Compare Double and Swap, which compares two 8-byte values. These atomic operations are described herein in terms of their definition in the IBM ESA/390 *Principles of Operation* manual. It will be obvious to one of ordinary skill in the art that these particular instructions are meant to be representative of the function to be accomplished: equivalent techniques may be used in place of the described instructions, provided that the necessary atomicity of operation is maintained.

The LM instruction requires three parameters. The first parameter is a register to be used as the starting location of the load operation, and the second is a register to be used as the ending location. The third parameter points to the beginning storage location of the value(s) to be loaded into the registers. Both the CD and CDS comparison instructions require three parameters. The first and third parameters are pointers to the values being compared. The second parameter is a pointer to a new value that will be copied in place of the value addressed by the first pointer if the first and third values are equal; otherwise, when the values are not equal, the value pointed to by the third pointer is copied into the location addressed by the first pointer. (Note that Compare and Swap is the technique mentioned in the previously-discussed IBM Technical Disclosure Bulletin article for performing atomic updates on AVL trees.)

The preferred embodiment of the present invention will now be described in more detail with reference to FIGS. 2 through 4.

The technique of the present invention requires little extra storage beyond that used by the tree nodes. In particular, no time stamps, counts, or attribute values are added to the nodes of the tree. Instead, a tree control block is used along with two trees that are always present. The two trees are identical at any time when there are no updates occurring. The control block is described in more detail below with reference to FIG. 2A. The present invention uses a lock (an exclusive lock) for serializing update tasks, but does not use locks for those tasks that only perform searches and retrieve results without altering stored data. Therefore, search tasks will never suspend for purposes of serializing access. The disclosed technique also guarantees that the search tree is valid at all times, and thus there will never be a time when a searcher needs to research the tree because an update has happened: when the searcher finds a result, it can reliably use this result without further validity comparisons. Furthermore, the use of reference counts as disclosed herein enables completely (and safely) removing from the tree any nodes that are no longer needed and freeing the storage that was used by those nodes.

Figure 2A:
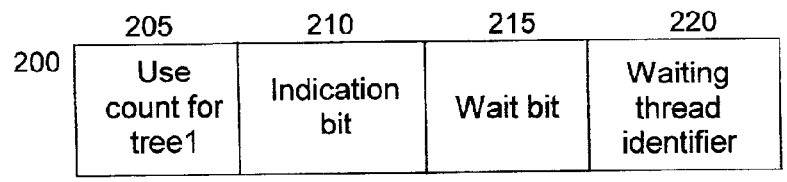
FIGS. 2A–2C provide examples of the control blocks and data structures that may be operated upon by the present invention.

FIG. 2A illustrates the format of a control block 200 that may be used to implement the present invention. Note that use of the term "control block" is not meant to imply any particular implementation technique. In addition, the fields shown therein may be altered without deviating from the scope of the present invention. (For example, the order of the fields may be changed, provided that those fields which are operated upon jointly by the atomic operations remain properly co-located.)

In the preferred embodiment, the control block 200 comprises: (1) a use count 205; (2) an indication bit 210; (3) a wait bit 215; and (4) an identifier 220 of a waiting thread, which may be null if no thread is currently waiting. Preferably, each of the trees has its own separate copy of control block 200 which is stored in the tree root's control block so that obtaining access to a particular tree provides access to the bit settings and use count for that tree.

Figure 2B:
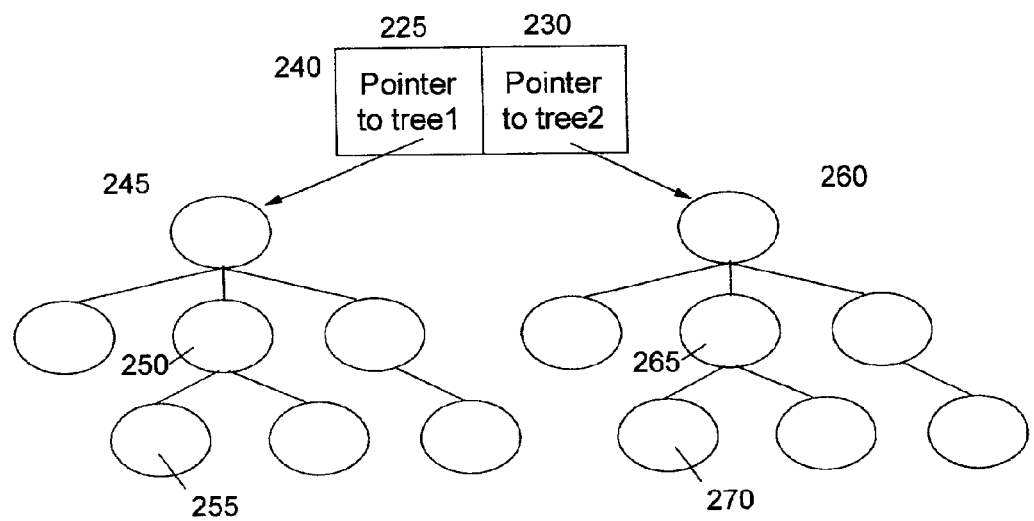
Figure 2C:
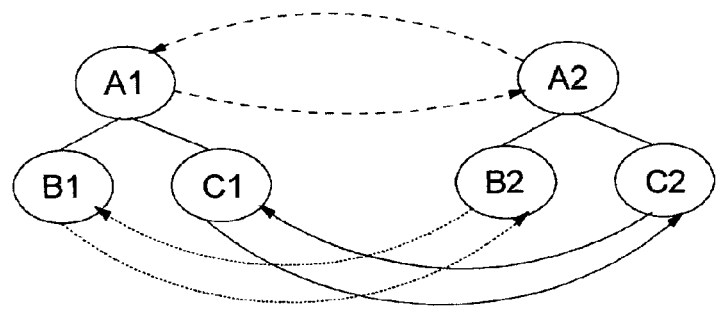

The novel technique of the present invention will now be briefly summarized. Following this summary, the algorithms which may be used to implement this technique will be described with reference to FIGS. 3 and 4. As stated above, two trees exist at all times. FIG. 2B illustrates how two pointer values 225, 230 are used in the present invention to point to the two trees 245, 260. According to the preferred embodiment, these pointer values are stored in contiguous storage 240 so that both values can be retrieved and set with a single atomic LM instruction. Every node in the two trees has a pointer to its twin node in the other tree, as is shown in FIG. 2C using pairs of lines of various styles. It is not necessary that these twin pointers reside in contiguous storage.

At any point in time, one of the trees is being used for searching while the other is dedicated to update operations. For ease of reference, the tree in which searches are conducted is referred to herein as "tree1", while the update tree is referred to as "tree2". Multiple tasks may be executing searches against tree1 at the same time, but only one update at a time can be made against tree2. If there are no updates being made, then tree1 and tree2 are identical, and all searches proceed against tree1. When an update request is processed, the update is made to tree2, and a very fast switching operation is then performed so that the just-updated tree becomes the tree to be searched (i.e. the new tree1). New searchers then enter this new tree1. Once any searchers that were still in the process of using the old tree1 that has been switched to become tree2 complete their searches, this now out-of-date tree2 is then revised to bring it into alignment with tree1. The technique for revising the new tree2 is also very fast and efficient: no tree traversals are required to find the nodes to be updated. Instead, while the original update is being processed against tree2 (the tree2 that becomes tree1 after the switch), entries are placed on a transaction queue. These entries are pointers to the twin of the nodes that were changed in tree2, and thus represent the actions that must be taken to carry out this particular update on tree1 after tree1 and tree2 are switched. Once the switch takes place, the recorded (i.e. queued) transactions are simply played back against the new tree2, enabling it to very quickly come back into alignment with the tree that is actively being searched (tree1).

Note that each pair of twin nodes points to the same underlying data (except, of course, for brief periods when the trees may be out of alignment during an update). Thus, use of two trees requires very little extra storage. For example, when the present invention is being used with network routing tables, there need be only one copy of each route entry, where that route entry is then pointed to by both of the trees.

Figure 3A:
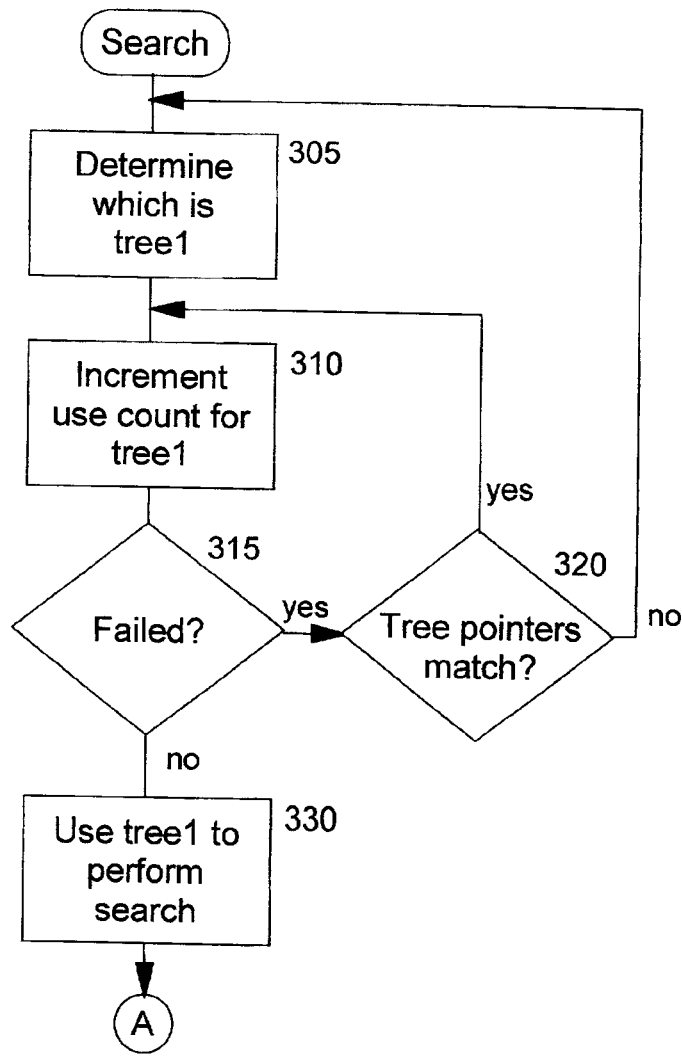
FIGS. 3 and 4 provide flowcharts which set forth logic that may be used to implement the preferred embodiment of the present invention.
Figure 3B:
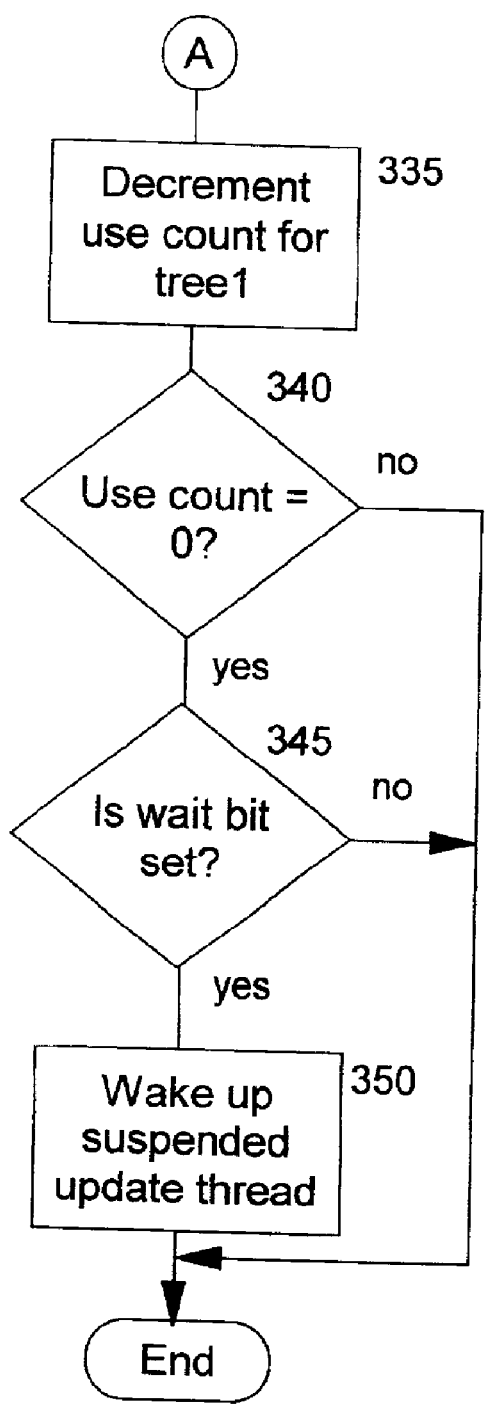

The logic that is preferably used by the search process of the preferred embodiment is depicted in FIG. 3. This process begins at Block 305, where a determination is made as to which of the two trees is currently tree1 (i.e. the tree to be used for searches). This determination is preferably made using an LM instruction, which loads the tree pointers (see FIG. 2B) in a particular order. In the preferred embodiment, the pointer to the search tree is always loaded into the first register (or perhaps simply a first storage area, if an atomic load technique other than LM is used) and the pointer to the update tree is always loaded into the second register (or a second storage area). The pointer to tree1 is retrieved from this first register and stored for use during the search algorithm.

A copy of the remaining values from tree1's control block (see FIG. 2A) is obtained next, and the use count for tree1 is then incremented and an attempt is made to store the incremented value (along with the other fields of the control block) using a CDS (Block 310). When using a CDS instruction having the three parameters described above, the order of parameters for this increment operation is: (1) the value copied from the control block in Block 310; (2) the value of the control block as incremented; and (3) the current value of the control block. Block 315 tests to see whether this increment operation failed. For example, suppose the values copied from the control block are (5, 0, 0, 0, . . . ), indicating that five searchers are already using tree1. The current search task increments this value to 6. If the CDS determines that the current control block for tree1 no longer contains a use count of 5, then the number of active searchers has changed. The value may already be 6, for example, indicating that some other new search task has already updated the control block. Or, the value may be 4, indicating that one of the active search tasks has ended. In any case, the current search task cannot update the control block when the use count does not match because to do so would corrupt the use count value. Thus, the use count value must be obtained anew, and the increment operation retried. To determine whether the trees have been switched before attempting the increment again, processing continues from Block 315 to Block 320 which tests whether the tree pointers match. The pointer to tree1 that was copied during operation of Block 305 is compared to the first tree pointer currently stored in the control block (see element 225 of FIG. 2B). If these pointer values do not match, then the search algorithm is not pointing to the correct tree1, and control returns to Block 305 to re-load the pointers and begin again. (This mismatch between pointers typically occurs because the update process has switched tree1 and tree2.) If the pointer values do still match, then it is not necessary to re-load the pointers; control simply returns to Block 310 to attempt the increment operation again. (Note that the incremented value computed in Block 310 has not been stored in control block 200 when the CDS fails, according to the way in which the CDS instruction operates, and thus repeatedly iterating these logic blocks does not introduce an error situation.)

The test in Block 315 may yield a positive result in other situations besides changes to the use count. For example, the value of the indication bit may have changed between the time when the control block values are copied and when the CDS operation is attempted, indicating that the update process (depicted in FIG. 4) is switching tree1 and tree2. Changes of this type also cause processing to transfer to Block 320 to determine whether the trees have been switched.

The test in Block 315 has a negative result when the values in tree1's current control block are still what the current search task expects them to be. Processing therefore continues to Block 330 where the search is performed using tree1. Note that in the case where a search task is processing while an update is also processing, the logic in Blocks 305 through 320 ensures that the search task will find the correct tree against which its search is to be performed.

At Block 335, the use count for tree1 is decremented using a CDS operation. The parameters of this CDS are: (1) a value that is retrieved from the tree's control block; (2) the decremented value; and (3) the tree's current control block values. Block 340 then tests to see if the use count resulting from this decrement is zero. If so, then this search task was the last active searcher using this tree, and processing continues to Block 345 which checks to see if the wait bit in the current control block is set. If it is, then the update thread has been suspended while waiting for the searchers to finish using this tree (and the tree they are searching is now actually tree2, because they were in the middle of searching the tree when the trees were switched). In this case, the suspended update thread is located using the stored pointer (see element 220 of FIG. 2A), and that thread is awoken (Block 350). The processing of FIG. 3 then ends for this search task.

Returning now to the description of Block 340, if this test has a negative result, then there are still active searchers using this tree (which may have been switched and is now actually tree2), and thus processing must bypass the wake-up operation in Block 350. The wake-up operation is also bypassed when the test in Block 345 has a negative result, indicating that there is no suspended update thread.

Figure 4B:
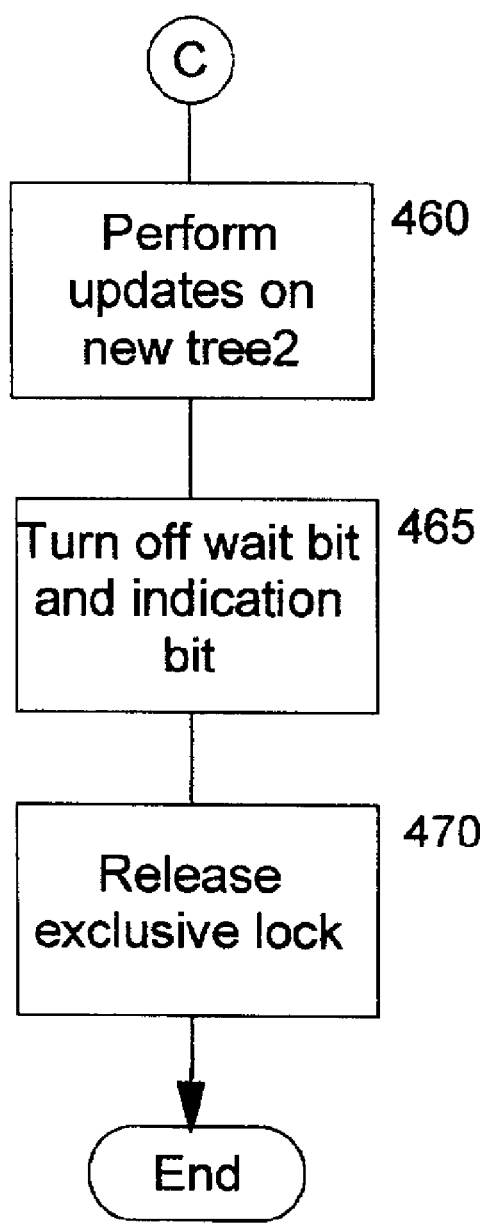

FIG. 4 depicts the logic that is preferably used to implement the update process of the preferred embodiment. At Block 405, a determination is made as to which of the two trees is currently tree2 (i.e. the tree to be used for updates), preferably using an LM instruction (as described above with reference to Block 305 of FIG. 3). The pointer to tree2 is retrieved and stored for use during the update algorithm. An exclusive lock is then obtained on tree2 (Block 410), using any suitable locking technique (such as binary semaphores).

At Block 415, the actual update operation is performed using tree2. Note that this update operation is unaffected by the presence of search tasks operating on tree1. The tree traversal and modification information used in making this particular update to tree2 is stored on a transaction queue (Block 420) for later replay against tree1. For example, suppose the update requires locating a particular node of the tree and then deleting that node. If the node to be deleted is element 255 of FIG. 2B, then in the preferred embodiment the queued transaction generally comprises (1) a record to change node 265 so that its left branch will point to an updated node that replaces node 270, and (2) a record to delete node 270, which is node 255's twin. While a number of complex, computationally expensive tree traversal operations may be required in determining the steps to take when performing the original update against tree2, the subsequent updates that will be performed (at Block 460, after the trees are switched) to the tree that is now tree1 will omit all of those expensive determinations because of the identical structure of the trees and the existence of the queued transaction (and its use of the twin pointers).

After the update has been performed and the update transaction is queued, the indication bit for tree1 is set on (Block 425) to indicate that an update of the search tree is needed. Preferably, a CS instruction is used for this purpose, and operates on the first four bytes of tree1's control block. Note that this bit setting will cause newly-arriving search tasks to avoid beginning their search until after the switch is complete, by operation of the logic of Block 315 of FIG. 3.

In Block 430, the trees are switched, so that the newly-updated tree becomes the tree to be used for "new" searches and so that the "old" search tree can now be updated to match it. Preferably, this switch process comprises reordering the tree pointers 235, 240 using a CDS instruction, so that these reordered values will be obtained by subsequent LM instructions.

The logic of Blocks 435 through 445 is designed to handle searchers leaving the tree that has just become tree2. Block 435 checks the use count for tree2. If the use count is not greater than zero, then there are no active searchers and the test in Block 435 has a negative result. Control therefore transfers to Block 455. On the other hand, when there are still active searchers using what is now tree2, then the use count is greater than zero and control reaches Block 440 where a CDS instruction is used to set tree2's wait bit and to store a pointer to the current update thread into the control block. (Setting the wait bit indicates that a searcher is still using this tree2.) After this CDS instruction is performed, the test in Block 445 checks to see whether the use count of the CDS matches the value that this update process expects. If it did not, then a searcher has just finished using tree2, so control transfers back to Block 435 to determine whether this was the final active searcher. Otherwise, when the use count matches what the update task expects, there has been no change in the number of active searchers and thus the update thread is preferably suspended for the time being (Block 450). In this case, the wait bit in tree2's control block has been set by the successful CDS instruction of Block 440, and the update thread will remain suspended until it is awakened by the final active searcher reaching the logic of Block 350 of FIG. 3.

The test in Block 455 asks whether the update thread is currently suspended. This test is shown in FIG. 4 as repeating until a negative result occurs. As will be obvious to one of skill in the art, this depiction is meant to show that processing does not continue on to Block 460 unless the update thread is no longer suspended. In an actual implementation, this would typically be accomplished by using operations such as a wait and a subsequent signal on a semaphore, rather than a constantly repeating loop. Thus, a negative result for the test in Block 455 occurs following the awakening of the suspended update thread, or when the thread did not suspend because there were no active searchers using tree2. In either case, control reaches Block 460 which performs the updates against the current tree2 by playing back the queued transaction (as discussed above with reference to Block 420). At this point, the two trees are again synchronized. Block 465 turns off the wait bit and the indication bit in tree2's control block, in preparation for enabling subsequent update operations to access tree2. The exclusive lock held by the update thread is then released (Block 470), and the processing for this update ends. Each subsequent update executes the logic of FIG. 4, causing another switch of the trees as has been described.

As has been demonstrated, the present invention defines an efficient technique for serializing access to data structures while ensuring that the contents of the data structure are valid. This occurs without requiring searchers to perform compute-intensive comparison operations to determine validity and without requiring searchers to use locks on the data structure. Empirical results of evaluations that have been conducted show that the cost of retrieving and updating information using this technique is approximately 50 percent less than the cost of using prior art techniques. Furthermore, in prior art solutions that use only a single tree, the exclusive locking process that is required for performing an update operation causes a very large spike in storage consumption as searchers become suspended awaiting completion of the update (and release of the lock), where this suspension requires information for the searchers to be stored. In addition, as additional search requests are generated in these prior art systems, additional threads are typically created to handle the new requests because the existing threads are all blocked (i.e. suspended). However, these new threads will quickly become blocked as well, further increasing the storage consumption. With the present invention, on the other hand, search threads do not suspend and thus do not cause this type of spike in storage space. Only update tasks suspend, and at any given time there is likely to be only one such suspended update task (if any) due to the efficient technique with which updates are carried out when using the present invention.

The disclosed technique may be used advantageously for many applications in which searches must be guaranteed accurate search results and in which rapid processing of data structure updates is necessary. As an example, these techniques may be used for optimizing performance of data structures used for network routing.

While the preferred embodiment of the present invention has been described, additional variations and modifications in that embodiment may occur to those skilled in the art once they learn of the basic inventive concepts. In particular, while the preferred embodiment has been described in terms of accessing tree structures, the inventive concepts of the present invention may be applied advantageously to other types of data structures as well. Therefore, it is intended that the appended claims shall be construed to include both the preferred embodiment and all such variations and modifications as fall within the spirit and scope of the invention.

What is claimed is:

1. A method of searching and updating indexes to data in a multi-processing environment, comprising steps of:

creating two identical indexes, both indexes representing an initial state for accessing a single copy of data, a first index for searching and a second index for updating;

updating the second index;

responsive to each update of the second index, switching the indexes so that the first index becomes the second index and the updated second index becomes the first index;

allowing searches that are in progress using the first index, before switching the indexes, to continue until completion after switching the indexes, using the newly-switched second index;

after switching the indexes, initiating new searches using the newly-switched first index;

when all searches in the newly-switched second index have completed, updating the newly-switched second index in an identical manner as the update to which the switching step was responsive; and preventing another operation of the switching step until completion of the step of updating the newly-switched second index in the identical manner.

2. A program product storage medium containing computer instructions that when executed in a computer perform a method of searching and updating indexes to data in a multi-processing environment, the method comprising steps of:

creating two identical indexes, both indexes representing an initial state for accessing a single copy of data, a first index for searching and a second index for updating;

updating the second index;

responsive to each update of the second index, switching the indexes so that the first index becomes the second index and the updated second index becomes the first index;

allowing searches that are in progress using the first index, before switching the indexes, to continue until completion after switching the indexes, using the newly-switched second index;

after switching the indexes, initiating new searches using the newly-switched first index;

when all searches in the newly-switched second index have completed, updating the newly-switched second index in an identical manner as the update to which the switching step was responsive; and preventing another operation of the switching step until completion of the step of updating the newly-switched second index in the identical manner.

3. A computer program product for serializing data structure retrievals and updates in a multi-processing computer system, the computer program product embodied on one or more computer-readable media and comprising:

computer-readable program code means for creating two identical data structures, both representing an initial state for accessing a single copy of stored data;

computer-readable program code means for performing searches against a first of the two data structures, the computer-readable program code means for performing searches further comprising a first program instruction for incrementing a search use count for the first data structure atomically during each search to ensure no interference from other processes during that search and a second instruction for decrementing the search use count for the first data structure atomically after performing each search;

computer-readable program code means for performing a first update against a second of the two data structures, yielding a revised data structure;

computer-readable program code means for switching the first data structure and the revised data structure, responsive to completion of the computer-readable program code means for performing the first update, such that the first data structure becomes the second data structure and the revised data structure becomes the first data structure, the computer-readable program code means for switching the data structures further comprising a third instruction for re-ordering data structure pointers atomically to prevent interference from other processes during operation of the computer-readable program code means for switching; and computer-readable program code means for applying, after operation of the computer-readable program code means for switching, the first update against the second data structure, yielding a second data structure that is structurally identical to the first data structure, when the search use count for the second data structure has a value indicating that no searches are being performed against the second data structure.

4. The computer program product according to claim 3, further comprising:

computer-readable program code means for obtaining an exclusive lock on the second data structure prior to operation of the computer-readable program code means for performing the first update; and computer-readable program code means for releasing the exclusive lock after operation of the computer-readable program code means for applying the first update.

5. The computer program product according to claim 3, wherein the computer-readable program code means for performing the first update further comprises computer-readable program code means for queuing a transaction that specifics one or more data structure traversals and one or more data structure modifications that were performed to yield the revised data structure, and wherein the computer-readable program code means for applying the first update further comprises computer-readable program code means for performing the one or more data structure traversals and the one or more modifications specified in the queued transaction against the second data structure that results from operation of the computer-readable program code means for switching.

6. The computer program product according to claim 3, further comprising computer-readable program code means for performing a subsequent update against the second data structure that results from operation of the computer-readable program code means for applying the first update; and wherein operation of the computer-readable program code means for performing the subsequent update causes another operation of the computer-readable program code means for switching and the computer-readable program code means for applying.

7. A computer system for serializing data structure retrievals and updates in a multi-processing computer system, the computer system comprising:

means for creating two identical data structures, both representing an initial state for accessing a single copy of stored data;

means for performing searches against a first of the two data structures, the means for performing searches further comprising means for incrementing a search use count for the first data structure atomically during each search to ensure no interference from other processes during that search and means for atomically decrementing the search use count for the first data structure after performing each search;

means for performing a first update against a second of the two data structures, yielding a revised data structure;

means for switching the first data structure and the revised data structure, responsive to completion of the means for performing the first update, such that the first data structure becomes the second data structure and the revised data structure becomes the first data structure, the means for switching the data structures further comprising means for re-ordering data structure pointers atomically to prevent interference from other processes during operation of the means for switching; and means for applying, after switching the data structures, the first update against the second data structure, yielding a second data structure that is structurally identical to the first data structure, when the search use count for the second data structure has a value indicating that no searches are being performed against the second data structure.

8. The system according to claim 7, further comprising:

means for obtaining an exclusive look on the second data structure prior to operation of the means for performing the first update; and means for releasing the exclusive lock after operation of the means for applying the first update.

9. The system according to claim 7, wherein the means for performing the first update further comprises means for queuing a transaction that specific one or more data structure traversals and one or more data structure modifications that were performed to yield the revised data structure, and wherein the means for applying the first update further comprises means for performing the one or more data structure traversals and the one or more data structure modification specified in the queued transaction against the second date structure that results from operation of the means for switching.

10. The system according to claim 7, further comprising means for performing a subsequent update against the second data structure that results from operation of the means for applying the fist update; and wherein operation of the means for performing the subsequent update causes another operation of the means for switching and the means for applying.

11. A method for serializing data structure retrievals and updates in a multi-processing computer system, comprising steps of:
creating two identical data structures, both representing an initial state for accessing a single copy of stored data;
performing searches against a first of the two data structures, the performing searches step further comprising the step of incrementing a search use count for the first data structure atomically during each search to ensure no interference from other processes during the search and the step of decrementing the search use count for the first data structure atomically after performing each search;
performing a first update against a second of the two data structures, yielding a revised data structure;
switching the first data structure and the revised data structure, responsive to completion of the step of performing the first update, such that the first data structure becomes the second data structure and the revised data structure becomes the first data structure, the step of switching the data structures further comprising the step of re-ordering data structure pointers atomically to prevent interference from other processes during operation of the switching step; and
applying, after the switching step, the first update against the second data structure, yielding a second data structure that is structurally identical to the first data structure, when the search use count for the second data structure has a value indicating that no searches are being performed against the second data structure.

12. The method according to claim 11, further comprising steps of:
obtaining an exclusive lock on the second data structure prior to preforming the first update; and
releasing the exclusive lock after applying the first update.

13. The method according to claim 11, wherein the step of performing the first update further comprises the step of queuing a transaction that specifies one or more data structure traversals and one or more data structure modifications that were performed to yield the revised data structure, and wherein the step of applying the first update further comprises the step of performing the one or more data structure traversals and the one or more data structure modifications specified in the queued transaction against the second data structure that results from operation of the switching step.

14. The method according to claim 11, further comprising the step of performing a subsequent update against the second data structure that results from applying the first update; and wherein the step of performing the subsequent update causes repeating the switching step and the applying step.

15. A method for serializing data retrievals and updates in a computing environment, comprising steps of:
creating two identical indexes, both representing an initial state for accessing stored data and each indexing a single copy of the stored data;
performing searches against a first of the two indexes;
performing a first update against a second of the two indexes, yielding a revised index;
serializing information describing a traversal path taken through the second index for making the first update and one or more modifications made to the second index in the first update;
switching the first index and the revised index, responsive to performing the first update, such that the first index becomes the second index and the revised index becomes the first index;
applying, after the switching step, the first update to the second index, using the serialized information describing the traversal path and the one or more modifications to traverse and modify the newly-switched second index, thereby yielding a second index that is synchronized with, and structurally identical to, the first index; and
performing subsequent searches against the first index.

16. The method according to claim 15, further comprising the step of performing a subsequent update against the second index that results from applying the first update; and wherein the step of performing the subsequent update causes repeating the serializing, switching, and applying steps.

17. The method according to claim 15, wherein the indexes are implemented as trees.

18. The method according to claim 15, wherein the indexes are implemented as hash tables.

19. A method of serializing access to data in a computing system, comprising steps of:
creating two trees as indexes, both indexes representing an initial state for accessing a single copy of data, a first of which is used for searches and a second of which is used for update operations, each tree having a use count associated therewith;
carrying out searches using the search tree, further comprising the steps of:
determining, for each new search request, which of the trees is currently the search tree;
incrementing the use count for the search tree;
performing the new search request using the search tree; and
decrementing the use count for the search tree, responsive to completion of the performing step; and
carrying out each update using the update tree, further comprising the steps of:
determining which of the trees is currently the update tree;
performing an update to the update tree;
serializing the update tree to become the search tree and the search tree to become the update tree, responsive to completion of the steps of performing the update and serializing the record; and
applying the serializing record to the newly-switched update tree, provided that the use count for the newly-switched update tree has reached a value that indicates that no search requests are currently being preformed against this newly-switched update tree, delaying the step of applying the serialized record if necessary until the use count for the newly-switched update tree has reached this value, and wherein the step of applying the serialized record ensures that both the search tree and the update tree reflect each update.

* * * * *

UNITED STATES PATENT AND TRADEMARK OFFICE
CERTIFICATE OF CORRECTION

PATENT NO. : 6,868,414 B2  Page 1 of 1
APPLICATION NO. : 09/753992
DATED : March 15, 2005
INVENTOR(S) : Sanjay Khanna et al.

It is certified that error appears in the above-identified patent and that said Letters Patent is hereby corrected as shown below:

Column 7,
Line 29, change "the CD" to -- the CS --;
Line 57, change "research" to -- re-search --.

Column 15,
Line 1, change "modification" to -- modifications --;
Line 2, change "date" to -- data --;
Line 7, change "fist" to -- first --;
Line 45, change "preforming" to -- performing --.

Column 16,
Line 51, change "serializing the update tree" to
    -- serialing a record describing the update to the update tree;
    switching the update tree --;
Line 59, change "preformed" to -- performed --.

Signed and Sealed this

Eighteenth Day of September, 2007

JON W. DUDAS
*Director of the United States Patent and Trademark Office*